(12) United States Patent
Swoboda

(10) Patent No.: US 7,089,437 B2
(45) Date of Patent: Aug. 8, 2006

(54) APPARATUS FOR DETERMINING POWER CONSUMED BY A BUS OF A DIGITAL SIGNAL PROCESSOR USING COUNTED NUMBER OF LOGIC STATE TRANSITIONS ON BUS

(75) Inventor: Gary L. Swoboda, Sugar Land, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/920,180

(22) Filed: Aug. 1, 2001

(65) Prior Publication Data

US 2002/0194510 A1 Dec. 19, 2002

Related U.S. Application Data

(60) Provisional application No. 60/299,016, filed on Jun. 18, 2001, and provisional application No. 60/299,023, filed on Jun. 18, 2001.

(51) Int. Cl.
*G06F 1/26* (2006.01)
*G06F 1/12* (2006.01)

(52) U.S. Cl. .................. 713/320; 713/322; 713/401
(58) Field of Classification Search .............. 713/300, 713/322, 320, 400, 401
See application file for complete search history.

(56) References Cited

U.S. PATENT DOCUMENTS

| | | | | |
|---|---|---|---|---|
| 4,587,445 A | * | 5/1986 | Kanuma | 326/28 |
| 5,267,251 A | * | 11/1993 | Lenoir et al. | 714/812 |
| 5,874,833 A | * | 2/1999 | Perry et al. | 326/26 |
| 6,212,665 B1 | * | 4/2001 | Zarkesh et al. | 716/4 |
| 6,243,779 B1 | * | 6/2001 | Devanney et al. | 710/305 |
| 6,338,025 B1 | * | 1/2002 | Bowen et al. | 702/60 |

* cited by examiner

*Primary Examiner*—Thomas Lee
*Assistant Examiner*—Chun Cao
(74) *Attorney, Agent, or Firm*—William W. Holloway; W. James Brady; Frederick J. Telecky, Jr.

(57) ABSTRACT

In order to measure the power consumed by a bus in a digital signal processor, each bus conductor has a lead electrically coupled thereto. The lead is coupled to apparatus that provides a signal each time the logic state of the bus is changed. The total number of logic signal changes for a given period of time is determined. Because power is consumed by the bus only during logic state transitions, the total number of logic state transitions can be multiplied by the power consumed by the bus during each transition to provide the total power consumed during a predetermined period of time. The power consumed by the bus during each logic state transition can be determined by simulation or other techniques. The power consumed by the operation of the bus can be further divided into power consumed by the internal (on-chip) bus and the external (off-chip) bus.

17 Claims, 2 Drawing Sheets

US 7,089,437 B2

APPARATUS FOR DETERMINING POWER CONSUMED BY A BUS OF A DIGITAL SIGNAL PROCESSOR USING COUNTED NUMBER OF LOGIC STATE TRANSITIONS ON BUS

This application claims the benefit of U.S. Provisional Application No. 60/299,016, filed Jun. 18, 2001; and U.S. Provisional Application No. 60/299,023, filed Jun. 18, 2001.

RELATED U.S. PATENT APPLICATION

U.S. patent application Ser. No. 09/920193, entitled APPARATUS AND METHOD FOR CENTRAL PROCESSING UNIT POWER MEASUREMENT IN A DIGITAL SIGNAL PROCESSOR, invented by Gary L. Swoboda, filed on even date herewith, and assigned to the assignee of the present application is a related application.

BACKGROUND OF THE INVENTION

1. Field of the Invention

This invention relates generally to digital signal processing units and, more particularly, to power consumption of the buses found in digital signal processor units.

2. Background of the Invention

The digital signal processor and related devices have found increasing application in portable apparatus, such as cell phones, wireless internet devices, etc. The power consumption is a critical parameter for portable apparatus. The power consumption determines the size of the battery and the time between recharging the battery, key parameters in the portability of devices.

However, the power consumption parameter ha s several variables. The hardware implementing the device can, for example, be designed to run with minimum power expenditure. Even after every effort has been employed to reduce to power requirements of the implementing hardware, the software programs being executed by the hardware may not be optimized to provide minimum power consumption. In addition, not only can the central processing unit draw power, but bus activity can also result in the consumption of power. However, before these parameters can be optimized, a technique for the measurement of the power consumption must be provided.

A need has therefore been felt for apparatus and an associated method having the feature that the power consumption in a digital signal processor unit can be measured. It would be a feature of the apparatus and associated method to measure the power dissipated by the bus in a digital signal processing unit. It would be yet another feature of the apparatus and associated method to measure the power dissipated by the digital signal processor bus during a preselected period of activity. It would be a still further feature of the apparatus and associated method to separate the power consumed by internal bus and the power consumed by the external bus in a digital signal processing unit. It would be yet another feature of the apparatus and associated method to determine the power consumption of a digital signal processor bus for a selected portion of a software program. It would be a still further feature of the present invention to determine separately the power consumption of a digital signal processor bus for a plurality of portions of a software program.

SUMMARY OF THE INVENTION

The aforementioned and other features are obtained according to the present invention, by measuring the number of transitions of the digital signal processing unit bus. The number of transitions is determined by coupling a conducting lead to each conductor of the digital signal processor bus. Each lead is coupled to an input terminal of a first latch/flip flop component. The output of the first latch/flip flop component is coupled to a first terminal of a logic "exclusive OR" gate and to an input of a second latch flip flop component. The output terminal of the second latch/flip flop component is coupled to a second input terminal of the "exclusive OR" gate. The output terminal of the logic "exclusive OR" gate is coupled to a count unit, the count unit determining the number of transitions during each clock cycle. The count for each clock cycle is applied to an adder unit and the total number of counts determined. Because the transition on all of the bus conductors is monitored, the total number of transitions during a predetermined period can be determined. The total number of transitions determines the total energy consumption for a preselected period. The power consumed for an individual bus transitions can be determined by simulation or by other techniques. The power consumed by the bus can be further divided into power consumed during the operation of the internal (on-chip) bus and the power consumed by the external (Off-chip) bus. The power consumed can also be determined for one or more portions of a software program.

BRIEF DESCRIPTION OF THE DRAWINGS

FIG. 1A is a block diagram of the apparatus for determining the number of bus logic signal transitions during a selected period according to the present invention, while

DESCRIPTION OF THE PREFERRED EMBODIMENT

1. Detailed Description of the Figures

Referring to FIG. 1, a technique for measuring the power on a bus according to the present invention is illustrated. The signal on bus pin A of the bus is applied to latch/flip-flop 11A. The output terminal of latch/flip-flop 11A is applied to an input terminal of latch/flip/flop 12A and to a first input terminal of logic exclusive "OR" gate 14A. The output terminal of the latch/flip-flop 12 is coupled to the second terminal of logic "exclusive OR" gate 14A. The output terminal of logic "exclusive OR" gate 14A is coupled to an input terminal of count logic unit 15. Similar apparatus couples bus pin A+1 through bus pin N to the count logic unit 16. The output of count logic unit 16 is applied to adder unit 16A through adder unit 16Q. The output signals of adder unit 16A through 16Q are applied to register/control devices 17A through 17Q, respectively. The output signals of the register/control devices 17A through 17Q are applied to adder units 16A through 16Q to be added to the count from count logic unit 15. The output signals on the terminals of register/control devices 17A through 17Q are the total number of counted transitions. The register/control devices 17A through 17Q are activated by output signals from logic "AND gates 19A through 19Q, respectively. Logic "AND" gates 19A through 19Q each have an input terminal that receives a control signal from trigger unit 18 and an input terminal that receives a LOAD signal to activate the apparatus. The trigger unit 18 receives control signals that can activate the counting of the internal bus transitions, the external bus transitions, and selected portions of the program. Therefore, bus transition counts can be simultaneously determined for the internal bus, the external bus, and selected portions of the program, i.e., each portion of the program typically being designated as a window.

Figure 1A:
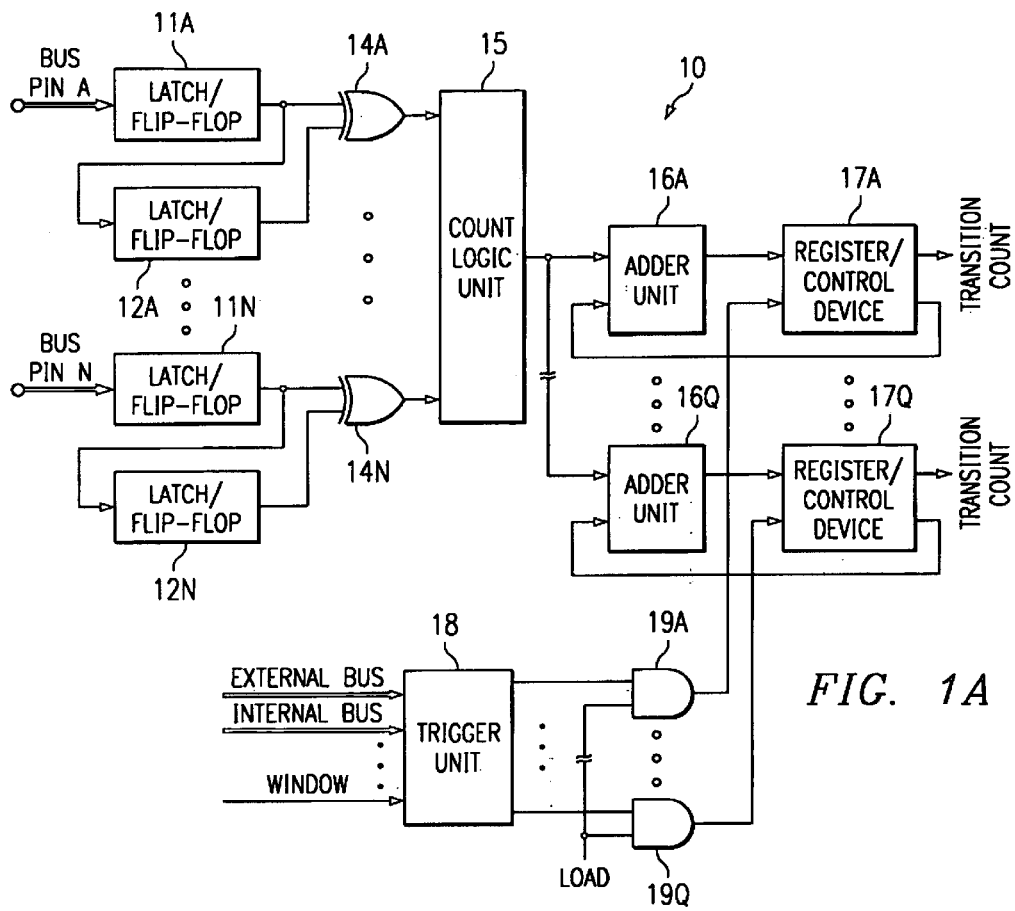
Figure 1B:
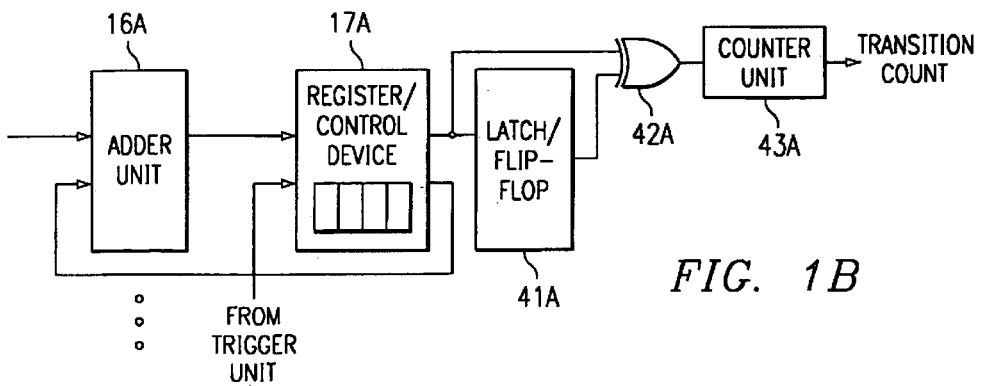
FIG. 1B is a block diagram of an alternative implementation for determining the number of bus logic signal transitions according to the present invention.

Referring to FIG. 1B, an alternative implementation of the apparatus of FIG. 1A receiving signals from the count logic unit is shown. Adder unit 16A and register/control device 17A are coupled together and receive control signals as illustrated in FIG. 1A. However, rather than applying a total count number to the output terminal(s) of register/control device 17A, the signal from the most significant bit of the internal register is applied to a first input terminal of logic "exclusive OR" gate 42A and to an input terminal of latch/flip-flop 41A. The latch/flip-flop 41A delays the signal from the register/control unit 17A for one clock cycle and applies the output signal to the second terminal of logic "exclusive OR" gate 42A. The output signal from the logic "exclusive OR" gate is applied to an input terminal of counter unit 43A. The result of this configuration is that the transition count can be scaled. A count is entered in the counter unit 43A only when the register in register/control device 17A has a logic "1" signal entered in the most significant bit position. Because of the speed of the modern processor, this configuration can provide numerical transition counts of more manageable size. As will be clear the application to adder unit 16A and register/control unit 17A is exemplary and similar apparatus can be added to each of the adder unit 16X and register/control unit 17X pairs.

Figure 2:
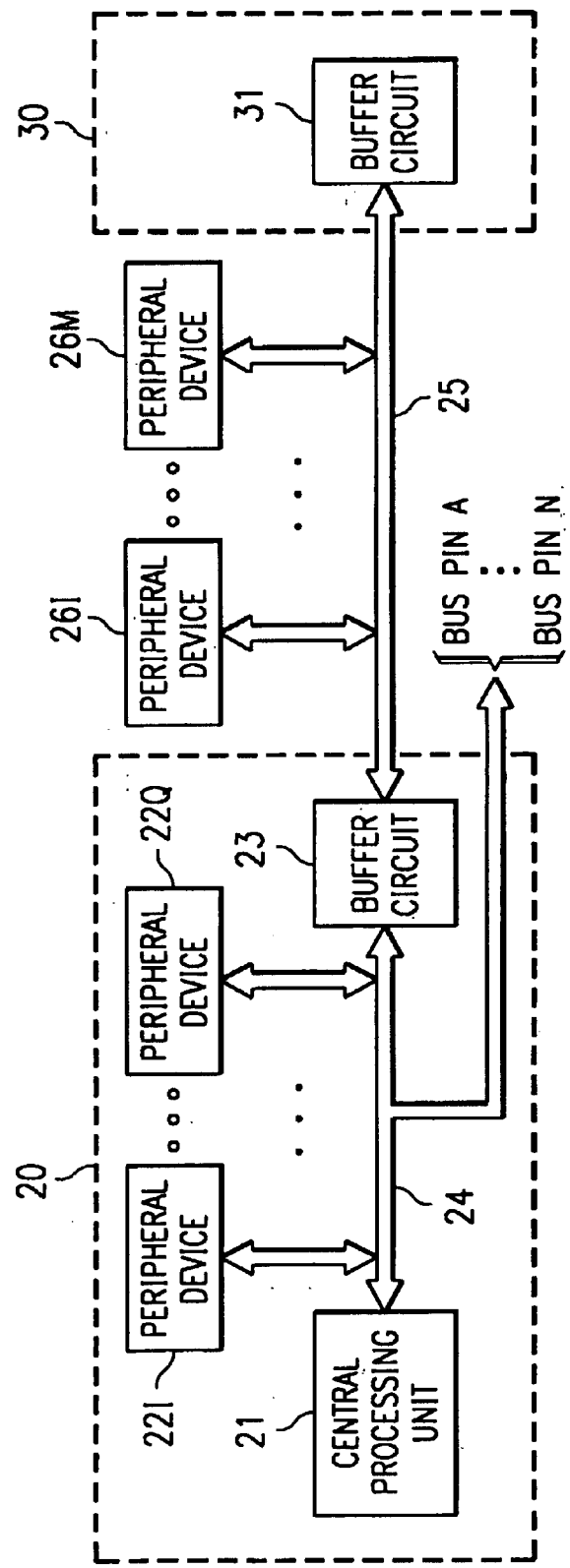
FIG. 2 is a block diagram illustrating the relationship of the internal (on-chip) bus and the external (off-chip) bus.

Referring to FIG. 2, the relationship of the internal or on-chip bus 24 to the external bus 25 is shown. The (on-chip) processor 21 is coupled to the internal bus 24. The internal bus 24 is coupled to (on-chip) peripheral device 221 through (on-chip) peripheral device 22Q and is coupled to buffer circuit 23. Conducting leads are coupled to internal bus 24 to provide the signals bus pin A through bus pin N to the latch/flip-flop circuits shown in FIG. 1. The buffer circuit 23 is coupled to the external bus 25. External bus 25 can be coupled to peripheral device 261 through peripheral device 26M and can be coupled to one or more other chip (represented by chip 30). Activity on the internal bus 24 is monitored by the signals on bus pin A through bus pin N. When the activity on (internal) bus 24 is directed to one of the devices coupled to external bus 25, additional power must be provided to drive the additional capacitance of the components coupled to the external bus 25. Buffer circuit 23 is part of the chip 20 configuration, the power used by the buffer circuit 23 is supplied by the power source (not shown) energizing chip 20.

2. Operation of the Preferred Embodiment

Each logic signal transition on a bus conductor requires power. Therefore, by determining the number of transitions on the digital signal processor bus, the power consumed as a result of bus signal activity can be determined. The output signal of latch 12A provides a one clock cycle delay as compared to the output signal of latch 11A. Thus when a logic signal transition has occurred on the bus pin A, the "logic exclusive OR" gate will apply a signal indicating a logic signal transition to the count logic 15. When no logic signal transition has occurred, no indication of a logic signal transition will be generated by the logic "exclusive OR" gate 14A. Because the circuitry coupled bus pin A through bus pin N is similar, during each clock cycle, a signal will be applied to the count logic unit 15 for each bus pin experiencing a logic signal transition. The count logic unit 15 determines the number of transitions that have occurred on the bus during the current clock cycle. The count from the count logic unit 15 is applied to adder unit 16. The value in adder unit 16 is transferred to register/control device 17. The register/control device 17 applies the contents of the register/control device 17 to output terminals and to adder unit 16. The contents of register/control device 17 can represent the total number of logic signal transitions. This value is returned to adder unit 16 so that subsequent transitions identified by adder unit 16 can be added thereto to form a cumulative total. Apparatus can be coupled to the register/control units to provide a scaled total transition count.

Because the number of transitions determines the power consumption resulting from bus usage, the total number of transitions provides the number from which the power consumption can be derived. The power consumed by each bus state transition can be determined by simulation techniques or by other techniques.

The trigger unit 18 can provide control signals that can activate and deactivate the register/control devices 17A through 17Q. These activations can occur during an identified external bus activity, during an internal bus activity, or both. Address signals can be used as control signals applied to trigger unit 18 distinguish between access to the internal bus or access to the external bus. In addition, the trigger unit 18 can activate the register/control device 17A (through 17Q) during a preselected window or windows of operation. In FIG. 1B, when a plurality of register/control devices is available, a plurality of software program portions can be monitored.

While the invention has been described with respect to the embodiments set forth above, the invention is not necessarily limited to these embodiments. Accordingly, other embodiments, variations, and improvements not described herein are not necessarily excluded from the scope of the invention, the scope of the invention being defined by the following claims.

What is claimed is:

1. Apparatus for measuring the power consumed by a digital signal processor bus during a selected clock cycles, the apparatus comprising:

a unit for counting the logic state transitions on the bus during the selected clock cycles;

a technique for determining the power consumption on the bus for each logic state transitions, wherein the bus power consumption is determined by the number of logic state transitions multiplied by the power consumption for each logic state transitions;

the unit including a plurality of transition detection circuits, each transition detection circuit coupled to one of the bus conductors;

a storage component, the storage component storing on the output terminal a first signal representative of a logic state of the coupled bus conductor;

a delay component coupled to the output terminal of the storage unit, the output terminal of the delay component storing a delayed signal, the delayed signal being the first signal delayed by a clock cycle; and a difference component coupled to the output terminal of the storage component and the output terminal of the delay component, the difference component generating a result signal when the first signal and the delayed signal are different.

2. The apparatus as recited in claim 1 wherein the storage component and the delay component are latch/flip-flop components and the difference component is a logic element capable of detecting a difference in consecutive bus states.

3. The apparatus as recited in claim 1 wherein the difference component is an "exclusive OR" logic gate.

4. The apparatus as recited in claim 1 wherein the unit includes:
- a count logic component coupled to all of the difference components, the count logic component determining the number of result signals during each selected clock cycle; and
- an adder component coupled to the count logic component, the adder component summing the number of result signals generated during each clock cycle and storing the count of result signals.

5. The apparatus as recited in claim 4 wherein the count of result signals is the count of the total number of transitions.

6. The apparatus as recited in claim 2 further including a trigger component, the trigger component responsive to control signals for activating the count of bus logic state transitions.

7. The apparatus as recited in claim 6 wherein the control signals determine whether the trigger component activates the count of bus logic state transitions unit during activity of an internal bus, during activity of the external bus, during activity of both the internal and external bus, or during a preselected window of the software activity.

8. The apparatus as recited in claim 6 further including a plurality of adder components, each adder component determining bus logic transitions in response to control signals from the trigger unit.

9. The method for measuring the power consumed by a bus of a digital signal processor during selected clock cycles, the method comprising:
- measuring a number of logic signal transitions of the bus during the selected clock cycles; wherein measuring includes:
  - comparing the state of a logic signal on each bus conductor during a first clock cycle with the state of the logic signal on the same bus conductor during the next sequential clock cycle;
  - generating a count signal when the state of a logic signal on a bus conductor is different during a second clock period that the state of the logic signal on the same bus conductor during the first clock period; and
  - during the selected clock cycles, determining the total number of count signals;
- determining the power consumed for each logic signal transition; and
- multiplying the number of logic state transitions during the selected clock cycles by the power consumed by each logic state transition.

10. The method as recited in claim 9 further including, in response to a first control signal, determining the total number of count signal signals for an external bus during the selected clock cycles.

11. The method as recited in claim 10 further including, in response to a second control signal, determining the total number of count signals for an internal bus during the selected clock cycles.

12. In digital signal processing system having an internal processors an internal bus; and at least one of an internal peripheral device coupled to the internal bus, an internal buffer unit coupled to the internal bus, and an external bus coupled to the buffer circuit; apparatus for measuring the power consumed by a power source energizing the internal bus and the external bus during selected clock cycles; the apparatus comprising:
- a plurality of temporary storage components, each temporary storage component coupled to a conductor of the internal bus, each temporary storage component applying the logic state signal to an output terminal;
- a plurality of delay components, each delay component having an input terminal coupled to the output terminal of a temporary storage component, the delay unit applying the logic state signal applied to the output terminal of the coupled temporary storage component during the next sequential clock cycle;
- a plurality of difference components, a first input terminal of each difference component coupled to an output terminal of a temporary storage component, a second input terminal of the difference component coupled to the output terminal of the temporary storage component coupled to the first input terminal, each difference component providing a difference signal when the signal applied to the first input terminal of the difference components is not the same as the signal applied to the second input terminal of the difference component;
- a count component having the output terminal of the difference components applied thereto, the count component determining the number of difference signals; and
- an adder unit coupled to the count component for adding the number of difference signals determined for each clock cycle, the total number of difference signals being multiplied by the power consumed for each logic state transition to provide the power consumed.

13. The apparatus as recited in claim 12 wherein the adder unit is activated for the selected clock cycles.

14. The apparatus as recited in claim 12 wherein the temporary storage component and the delay component are implemented with latch/flip-flop components and the difference component is implemented with an "exclusive OR" logic component.

15. The apparatus as recited in claim 12 wherein the apparatus further includes a trigger unit coupled to the adder component, the trigger unit responsive to first control signals for activating the adder component during the selected clock cycles.

16. The apparatus as recited in claim 15 wherein the buffer unit is coupled to an external bus, the trigger unit responsive to second control signals for measuring the difference signals on the external bus.

17. The apparatus as recited in claim 15 further comprising a plurality of adder components, each adder component activated by control signals from the trigger unit.

* * * * *